(12) United States Patent
Mizoguchi et al.

(10) Patent No.: US 11,755,857 B2
(45) Date of Patent: Sep. 12, 2023

(54) TWO-DIMENSIONAL CODE ENCODER

(71) Applicant: Satoshi Mizoguchi, Tokyo (JP)

(72) Inventors: Satoshi Mizoguchi, Tokyo (JP);
Mariko Mizoguchi, Tokyo (JP)

(73) Assignee: Satoshi Mizoguchi, Tokyo (JP)

( * ) Notice: Subject to any disclaimer, the term of this patent is extended or adjusted under 35 U.S.C. 154(b) by 11 days.

(21) Appl. No.: 17/737,066

(22) Filed: May 5, 2022

(65) Prior Publication Data

US 2022/0261568 A1 Aug. 18, 2022

Related U.S. Application Data

(63) Continuation of application No. PCT/JP2021/000402, filed on Jan. 7, 2021.

(30) Foreign Application Priority Data

Jan. 20, 2020 (JP) ................. 2020-006652

(51) Int. Cl.
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .............. G06K 19/06037; G06K 7/1417
See application file for complete search history.

(56) References Cited

U.S. PATENT DOCUMENTS

2012/0138693 A1 6/2012 Litz et al.
2014/0279560 A1* 9/2014 Pedersoli ........... G06Q 20/3276
705/64

FOREIGN PATENT DOCUMENTS

| JP | 2006-320622 A | 11/2006 |
| JP | 2011-186613 A | 9/2011 |
| JP | 5731061 B | 4/2015 |
| JP | 2017-035796 A | 2/2017 |
| JP | 2019-061564 A | 4/2019 |

OTHER PUBLICATIONS

International Search Report from the Japanese Patent Office in related PCT/JP2021/000402 dated Mar. 24, 2021.

* cited by examiner

*Primary Examiner* — Laura A Gudorf
(74) *Attorney, Agent, or Firm* — THE MARBURY LAW GROUP, PLLC

(57) ABSTRACT

A two-dimensional code encoder for a two-dimensional code which is generated on a mobile phone terminal or a personal computer includes a device configured to generate multiple two-dimensional codes in advance and to store to preserve the two-dimensional codes so generated, a device configured to affix the multiple two-dimensional codes so preserved individually to 12 surfaces of front and rear surfaces of polygonal plates of a three-dimensional polyhedron (a regular hexahedron), a device configured to tag the two-dimensional codes affixed to the 12 surfaces for storage, and a device configured to display the tagged two-dimensional codes two-dimensionally on screens of the mobile phone terminal or the personal computer.

2 Claims, 9 Drawing Sheets

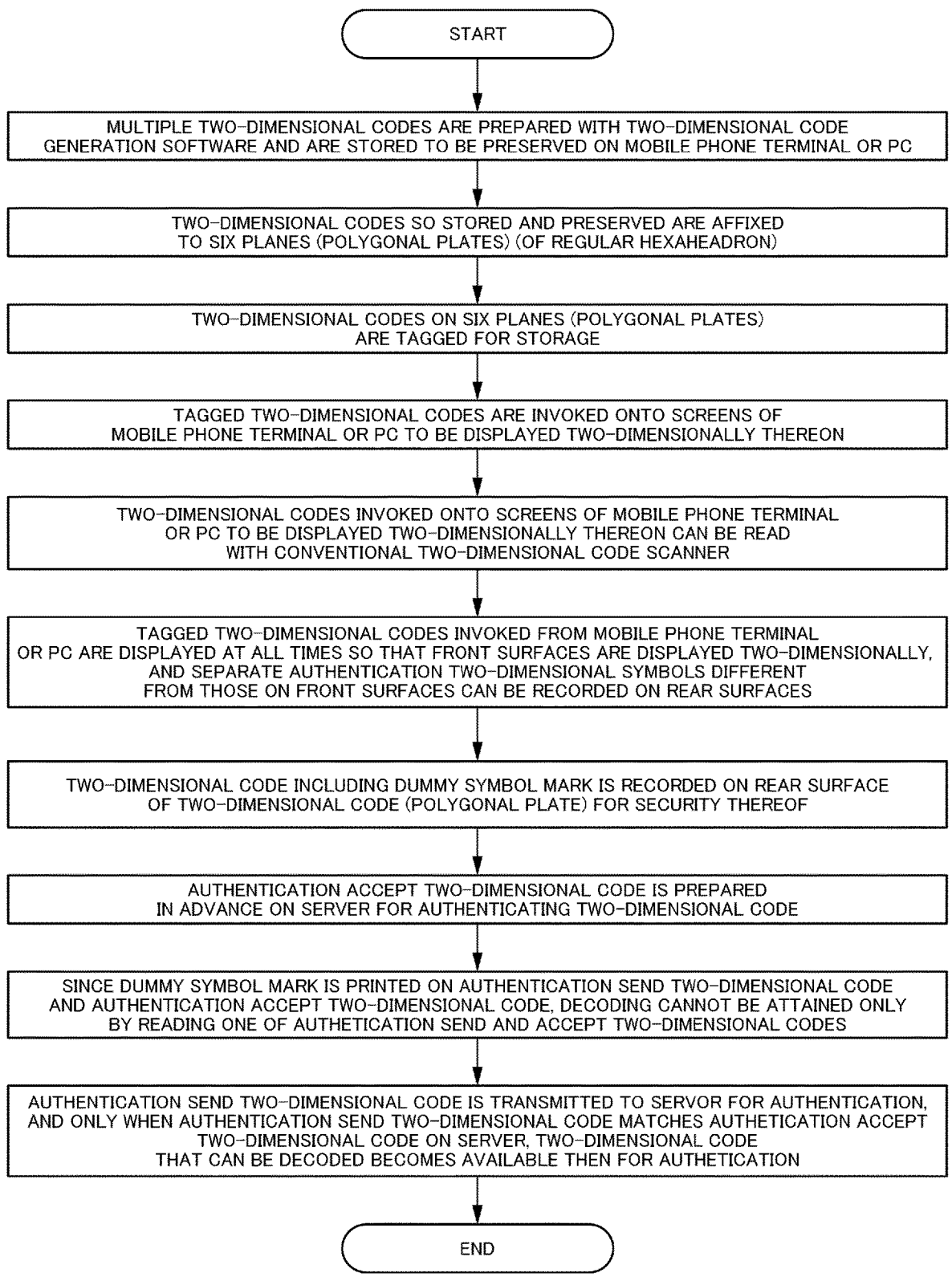

TWO-DIMENSIONAL CODE ENCODER

CROSS-REFERENCE TO RELATED APPLICATION

This application is a bypass continuation of PCT International Application No. PCT/JP2021/000402 filed on Jan. 7, 2021, the entire disclosure of which, including the specification, claims, drawings, and abstract, is incorporated herein by reference in its entirety.

BACKGROUND OF THE INVENTION

Field of the Invention

The present invention relates to a two-dimensional code encoder including a device for ensuring the security of a two-dimensional code to thereby enable the two-dimensional code to store a large volume of data.

Description of the Related Art

With a conventional two-dimensional code expressed by two monochrome gradations (black and white), a data area (information data cells) and a finder pattern or marker portion are expressed in the totally same dot depth. When a recording capacity of an information data cell portion is increased, the density of information data cells which make up the two-dimensional code itself is also increased, whereby the finder marker portion and the information cell portion get close to each other, resulting in a problem in that a certain length of time is taken before the finder marker is recognized.

In order for a two-dimensional code to be displayed in a planar fashion on screens of a mobile phone or a personal computer (PC) to be read by an area sensor, a limitation is imposed on the surface area of the two-dimensional code, and there still remains a big problem to be solved to increase the volume of information to be stored therein.

Various two-dimensional codes that have been developed by adopting the algorithms of the two-dimensional codes that were developed in 1980's in the United States of America (USA) continuously adopt the symbol structure which has been the idea of design of two-dimensional codes. The compression technology, compliance with multiple languages, and security concept were technologies taken into consideration then for the development in the USA, and hence, two-dimensional codes developed based on these technologies are not designed to have a structure for storing a large volume of information.

However, the recent technical innovations have remarkably increased the precision of area sensors and developed CPUs that can analyze an image at fast speeds, which has led to the development of two-dimensional codes that can record even documents, voice, and images.

In addition, as disclosed in JP-A-2011-186613, attempts have been made to realize multicolor cells and miniaturization of cells to express electronic data in a two-dimensional color code with high density.

With such two-dimensional color codes, as the number of colors used is increased, the risk is increased of easy occurrence of erroneous determination of the color of a cell due to the discoloration of the cell as a result of color fading, printing irregularity, illumination light, dirt, and the like. Due to this, the precision of decoding of a two-dimensional color code is lower than that of a two-dimensional code which is expressed by the two monochrome gradations (black and white).

As disclosed in JP-A-2017-35796, there has been proposed an attempt to ensure the security of a QR code (a registered trademark), which employs an algorithm developed in 1980's in the USA, by being displayed with a part thereof concealed.

With the US originated two-dimensional codes, however, all the encode and decode information as well as the data matrix codes and QR codes are disclosed to the general public all over the world, and any person can prepare codes and manufacture a reading machine therefor. Thus, even though a code is displayed with a part thereof concealed, it is assumed that the code can easily be decoded using the reverse engineering with a high possibility.

Additionally, in recent years, as disclosed in Japanese Patent No. 5731061, a three-dimensional code including multiple recording sections has been developed. In this three-dimensional code, a special light transmission object is used for the recording sections, and to record and read it, a complex procedure is required which is different from the recording and reading processing of the conventional two-dimensional code.

Although various types of two-dimensional codes and three-dimensional codes have been developed heretofore, a recording capacity and security still remain as problems to be solved.

SUMMARY OF THE INVENTION

There is proposed a device for increasing the volume of information to be stored in a two-dimensional code by reducing the configuration unit of a cell. An object of the present invention is to provide an encoder which can increase the recording capacity of a conventional two-dimensional code, provide a security which differs from a conventional one to a two-dimensional code, and enable a conventional easy scanning to be adopted to read symbols.

According to an aspect of the present invention, there is provided an encoder for a two-dimensional code which is generated on a mobile phone terminal or a personal computer, including a device configured to generate multiple two-dimensional codes in advance and to store to preserve the two-dimensional codes so generated, and a device configured to affix the multiple two-dimensional codes so preserved to individual planes of a three-dimensional polyhedron (a regular hexahedron).

The two-dimensional codes affixed to the individual planes are tagged to be preserved, and the tagged two-dimensional codes are invoked onto screens of a mobile phone terminal or a personal computer to be displayed thereon tow-dimensionally.

The two-dimensional codes invoked to be displayed two-dimensionally on the screens of the mobile phone terminal or the personal computer can be read with a conventional two-dimensional code scanner.

The tagged two-dimensional codes which are invoked from the mobile phone terminal or the personal computer are such that front surfaces thereof are always displayed two-dimensionally and separate two-dimensional authentication symbols which are different from symbols on the front surfaces are recorded on rear surfaces thereof, and the separate two-dimensional authentication symbols are inversely displayed upon receipt of commands from the mobile phone terminal and the personal computer.

As has been described heretofore, since the three-dimensional polyhedron (the regular hexahedron) has six planes (polygonal plates), an increase in information volume can be attained by affixing two-dimensional codes which are prepared in advance as shown in FIG. 3 to the individual planes of the three-dimensional polyhedron (the regular hexahedron).

Both front and rear surfaces of each plane of the three-dimensional polyhedron (the regular hexahedron) are configured to record information thereon, thereby making it possible to increase a recording capacity thereof further.

As to the security of a two-dimensional code, authentication information can be recorded on a rear surface of a plane on a front surface of which the two-dimensional code is displayed two-dimensionally, and hence, only information on the normal knowledge panel authentication (ID, password, and the like) is recorded on the front surface on which the two-dimensional code is displayed, and no secondary confirmed authentication information on the server is not recorded thereon. Thus, a copy analysis using a screenshot or the like can be prevented.

As has been described heretofore, according to the present invention, the volume of information can be increased by affixing the multiple images of the two-dimensional codes individually to the planes (the polygonal plates) of the three-dimensional polyhedron (the regular hexahedron). In addition, the security of the two-dimensional code can be ensured by recording the authentication information not on the front surface but on the rear surface of each plane of the three-dimensional polyhedron (the regular hexahedron). Thus, no special reading machine is required to read the two-dimensional code, whereby a conventional two-dimensional code reading machine can be made use of, thereby making it possible to provide the two-dimensional code which can be operated efficiently.

BRIEF DESCRIPTION OF THE SEVERAL VIEWS OF THE DRAWINGS

FIG. 9 shows a schematic flowchart of a two-dimensional code encoder according to the present invention.

DETAILED DESCRIPTION OF THE PREFERRED EMBODIMENTS

Figure 1:
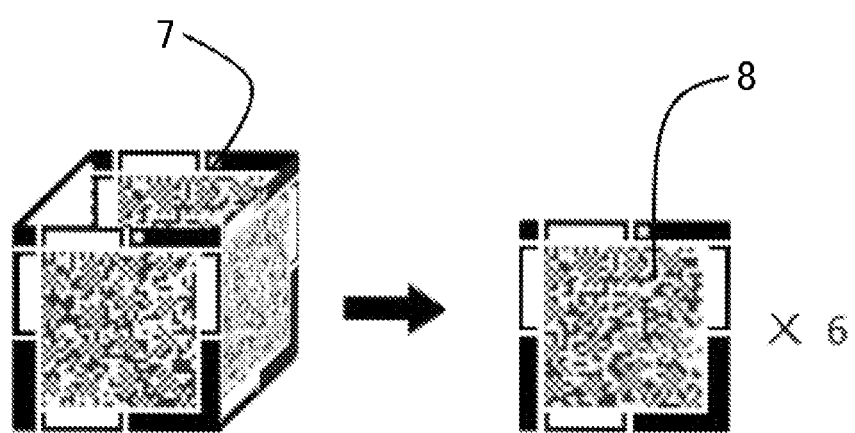
FIG. 1 shows one form of an embodiment of a two-dimensional code according to the present invention.
Figure 2:
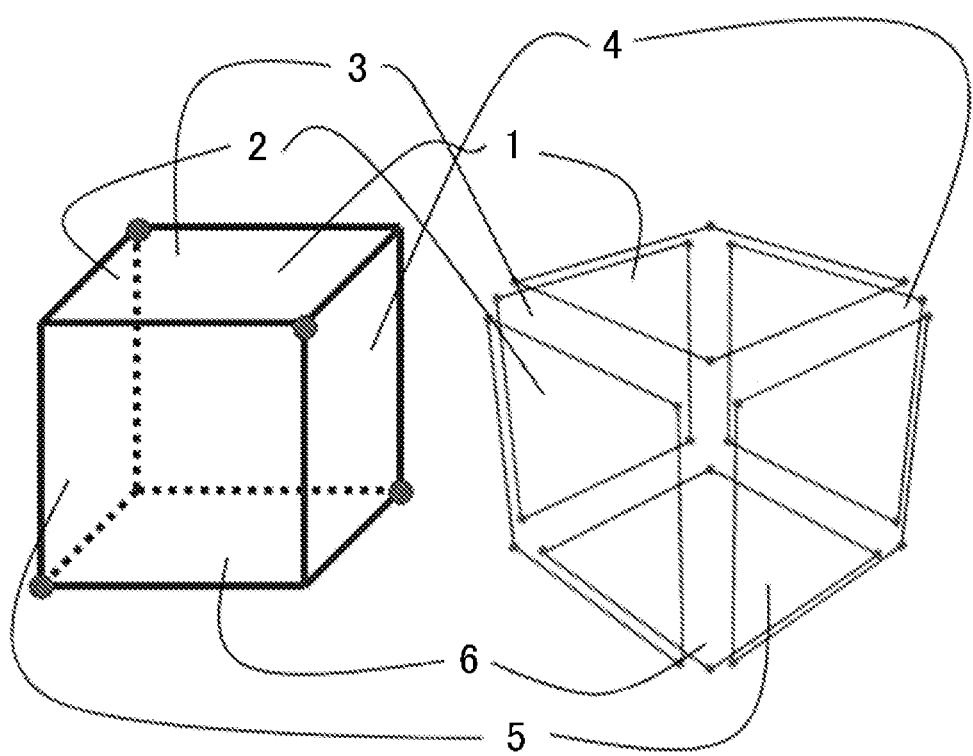
FIG. 2 shows one form of affixing planes of a three-dimensional or cubicle body where two-dimensional codes are affixed.
Figure 5:
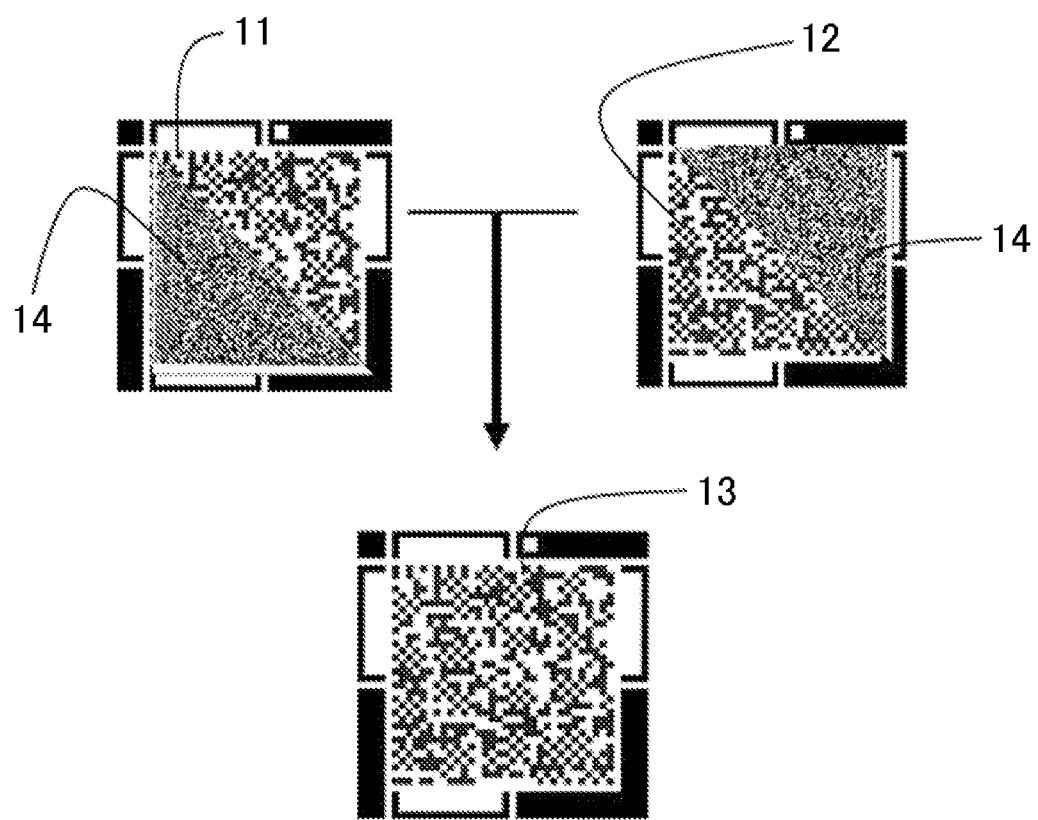
FIG. 5 shows one form of a two-dimensional code authentication.

Referring to FIGS. 1, 2 and 5, an embodiment of an invention claimed under claims of the present invention will be described.

Embodiment 1

Figure 3:
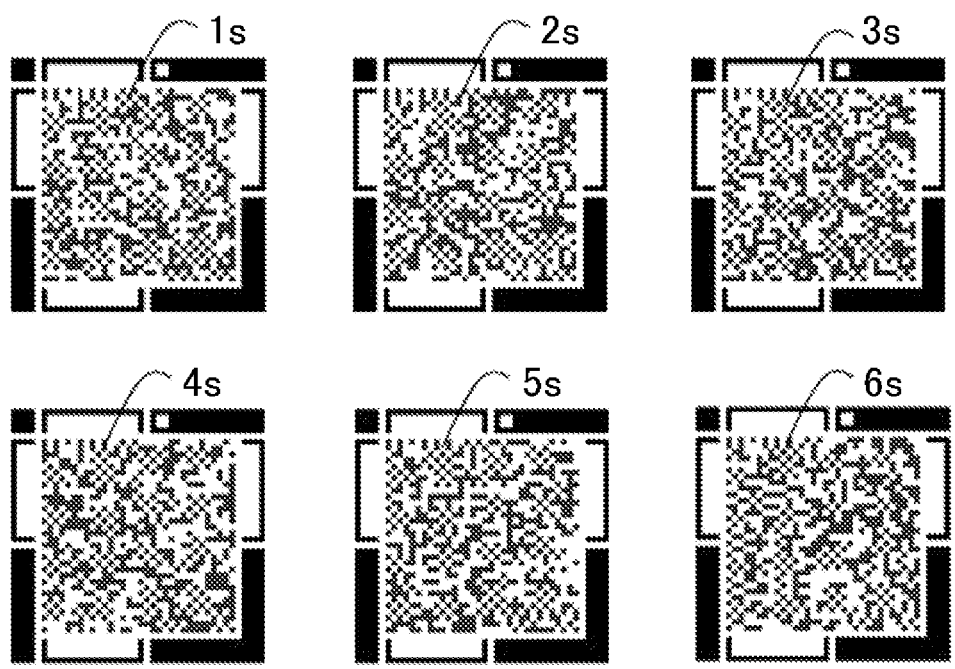
FIG. 3 shows one form of a design of two-dimensional codes which are generated in advance to be stored.

A device for generating two-dimensional codes is prepared on each of a mobile phone or a personal computer (PC), and multiple two-dimensional codes (refer to FIG. 3) are generated in advance and are stored to be preserved thereon. In FIG. 3, reference numerals is to 6s denote two-dimensional codes which are to be affixed on front surfaces of planes 1 to 6 of a regular hexahedron (refer to FIG. 2).

The multiple two-dimensional codes (refer to FIG. 3) so preserved are affixed individually to the six planes (the polygonal plates) of the three-dimensional polyhedron (the regular hexahedron) shown in FIG. 2 as shown in FIG. 1.

The two-dimensional codes (refer to FIG. 1) affixed individually to the planes of the three-dimensional polyhedron (the regular hexahedron) are tagged to be preserved. In FIG. 1, reference numeral 7 denotes a schematic view showing a state in which the two-dimensional codes are affixed individually to the planes of the regular hexahedron.

When invoked onto the mobile phone terminal or the PC, the tagged two-dimensional code (refer to FIG. 1) is displayed two-dimensionally as shown on a right-hand side of FIG. 1. In FIG. 1, reference numeral 8 denotes a state in which the two-dimensional code is affixed to a plane 1 of the regular hexahedron.

The two-dimensional code shown on the right-hand side of FIG. 1, which is invoked onto screens of the mobile phone terminal or the PC to be displayed thereon two-dimensionally, can be read with a conventional two-dimensional code scanner.

Figure 4:
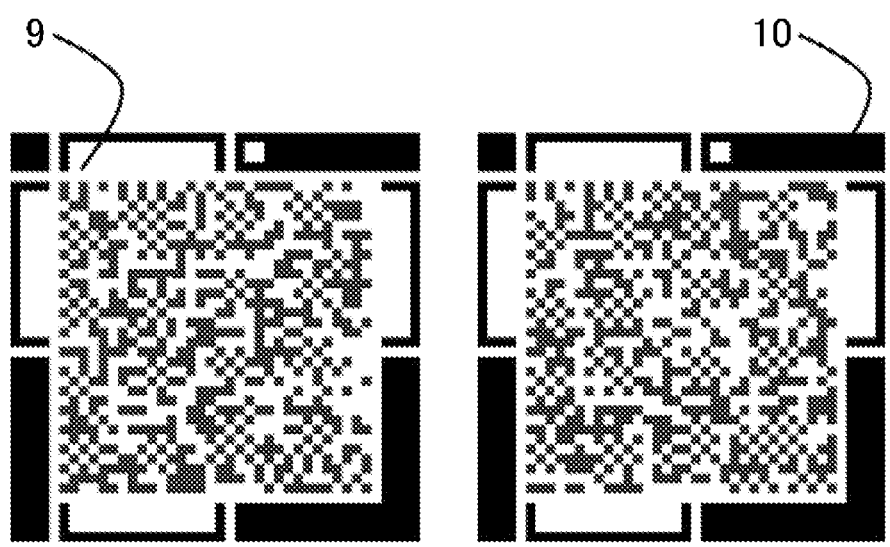
FIG. 4 shows one form of a front surface and a rear surface of a two-dimensional code which is generated in advance.

In the tagged two-dimensional code which is invoked from the mobile phone terminal or the PC, a front surface is always displayed two-dimensionally, and a separate authentication two-dimensional code or symbol, which differs from the two-dimensional code affixed to the front surface, can be recorded on a rear surface of the plane 1 of the regular hexahedron as shown in FIG. 4. In FIG. 4, reference numeral 9 denotes the two-dimensional code affixed to the front surface of the plane 1 of the regular hexahedron, and reference numeral 10 denotes the two-dimensional code which is affixed to the rear surface of the plane 1 of the regular hexahedron.

The two-dimensional codes are inversely displayed upon receipt of commands from the mobile phone terminal or the PC (refer to FIG. 4).

As to the security of the two-dimensional code, a two-dimensional code including a dummy symbol mark 14 (refer to FIG. 6) is displayed and recorded on the rear surface of the two-dimensional code (the polygonal plate). Reference numeral 11 denotes an authentication send two-dimensional code printed on the rear surface.

An authentication accept two-dimensional code (refer to FIG. 7) is prepared in advance on a server which authenticates a two-dimensional code. Reference numeral 12 denotes an authentication accept two-dimensional code on the server.

The dummy symbol mark 14 is printed on the authentication send two-dimensional code (refer to FIG. 6) and the authentication accept two-dimensional code (refer to FIG. 7), and as a result, the two-dimensional code cannot be decoded by reading only one of them.

Figure 6:
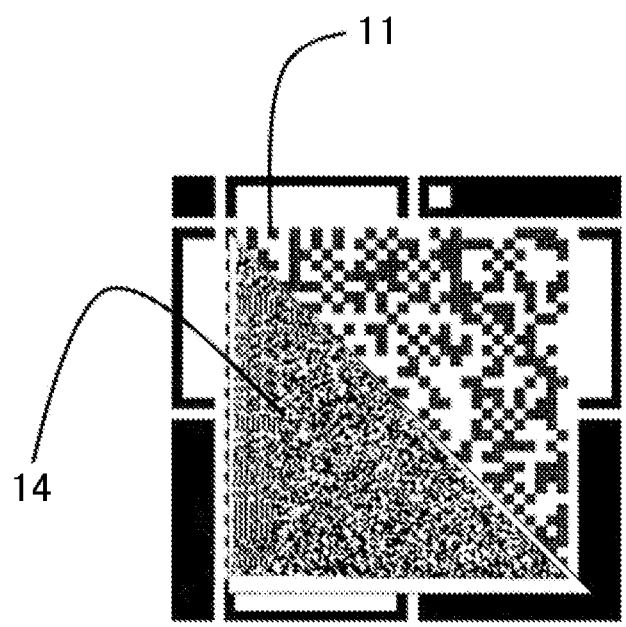
FIG. 6 shows a schematic view of an authentication send two-dimensional code.
Figure 7:
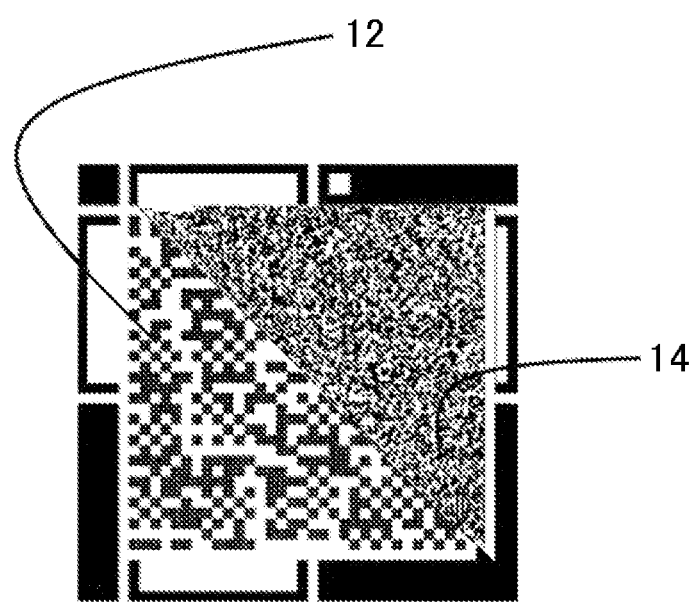
FIG. 7 shows a schematic view of an authentication accept two-dimensional code on a server.
Figure 8:
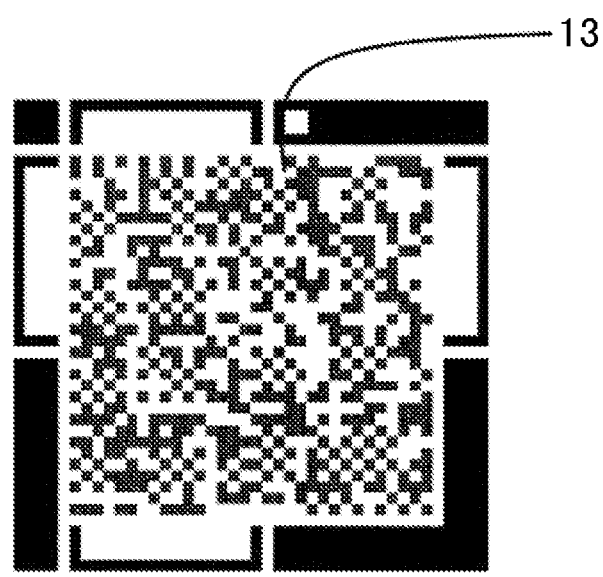
FIG. 8 shows a schematic view of an authentication code after the authentication has passed on the server.

The authentication send two-dimensional code shown in FIG. 6 is sent to the server for matching to the authentication accept two-dimensional code shown in FIG. 7, and only when the former two-dimensional code matches the latter two-dimensional code, a two-dimensional code shown in FIG. 8, which can be decoded, can be generated for authentication. Reference numeral 13 denotes a schematic view of a two-dimensional code which passes the authentication on the server.

With the configuration of the present invention that has been described heretofore, the device for generating a two-dimensional code is prepared on each of the mobile phone terminal or the PC, and the multiple two-dimensional codes are affixed in advance individually on the six planes (polygonal plates) of the three-dimensional polyhedron (the regular hexahedron) shown in FIG. 2, so that the authentication two-dimensional code is matched to the two-dimensional code on the server of an authentication organization, whereby the two-dimensional code encoder can be provided which provides a large recording capacity for and ensures the security of a two-dimensional code.

As has been described heretofore, when the two-dimensional code is invoked, the front surface thereof is always displayed two-dimensionally. Then, only the simple knowledge authentication information (ID and password) is recorded on the front surface, and the function is provided to automatically inverse the plane (the polygonal plate) after the knowledge authentication is completed, so that the two-dimensional code recorded on the rear surface (refer to FIG. 7) is matched to the two-dimensional code on the server (refer to FIG. 8) for two-stage authentication.

Further, a device for storing polygonal plates on which serially numbered and tagged two-dimensional codes are affixed in multiple layers (that is, in a superposed fashion) is also provided in an interior of each of the planes of the regular hexahedron. Then, the two-dimensional codes so stored are sequentially invoked onto the screens of the mobile phone terminal or the PC for reading, thereby attaining an increase in the recording capacity.

What is claimed is:

1. A two-dimensional code encoder for a two-dimensional code which is generated on a mobile phone terminal or a personal computer, comprising:
 a device configured to generate multiple two-dimensional codes in advance and to store to preserve the two-dimensional codes so generated;
 a device configured to affix the multiple two-dimensional codes so preserved individually to 12 surfaces of front and rear surfaces of polygonal plates of a regular hexahedron;
 a device configured to tag the two-dimensional codes affixed to the 12 surfaces for storage; and
 a device configured to display the tagged two-dimensional codes two-dimensionally on screens of the mobile phone terminal or the personal computer.

2. The two-dimensional code encoder according to claim 1, comprising:
 for the two-dimensional code according to claim 1 which is displayed two-dimensionally on the screens of the mobile phone terminal or the personal computer, a device configured, when reading a front surface of the two-dimensional code with an image receiving device, to automatically read information on a rear surface after the front surface has been read.

* * * * *